United States Patent [19]

Lavell et al.

[11] 4,052,656

[45] Oct. 4, 1977

[54] BATTERY CHARGING SYSTEM

[76] Inventors: Maurice Lavell, 2117 Larkwood St., West Covina, Calif. 91790; Donald P. Wilson, 1005 Riviera Drive, Pasadena, Calif. 91107

[21] Appl. No.: 604,615

[22] Filed: Aug. 14, 1975

Related U.S. Application Data

[63] Continuation-in-part of Ser. No. 462,752, April 22, 1974, abandoned.

[51] Int. Cl.² .............................................. H02J 7/04
[52] U.S. Cl. ........................................ 320/23; 320/32; 320/37; 320/39
[58] Field of Search ...................... 320/23, 24, 37, 38, 320/39, 40, 44, 45, 32

[56] References Cited

U.S. PATENT DOCUMENTS

| 3,329,882 | 7/1967 | Sobel | 320/45 X |
| 3,517,295 | 6/1970 | Lapuyade | 320/23 X |
| 3,869,657 | 3/1975 | Shoji et al. | 320/39 |

*Primary Examiner*—Robert J. Hickey
*Attorney, Agent, or Firm*—Fulwider, Patton, Rieber, Lee & Utecht

[57] ABSTRACT

Apparatus and method for charging storage batteries by continuously sensing particular battery parameters and controlling the charging current in response thereto to charge a single battery, or a string of batteries. The batteries are charged in a charging cycle including a high charging current stage, a controlled charge tapering stage, and a finishing current stage so that the batteries are charged in as short a time as possible without injuring the batteries regardless of their age or condition.

17 Claims, 4 Drawing Figures

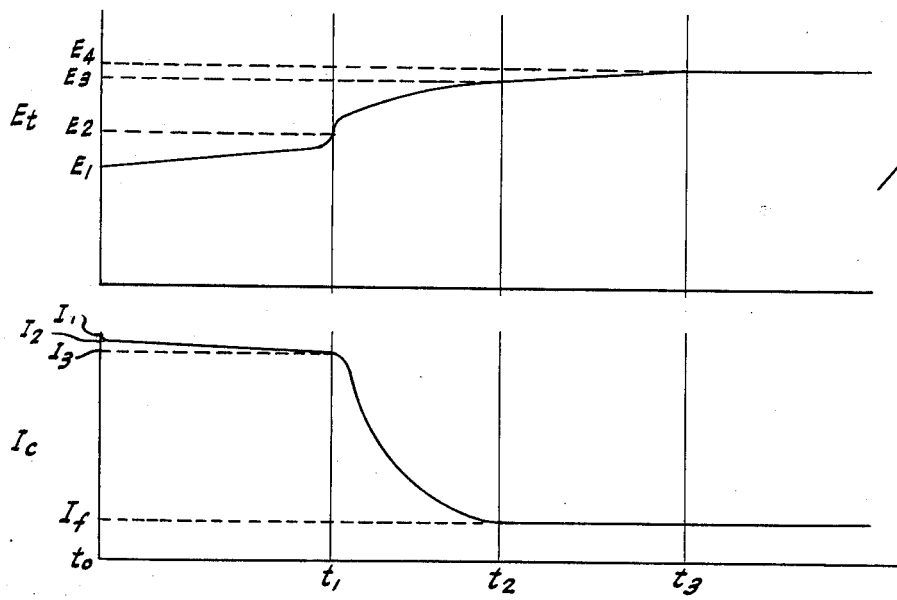
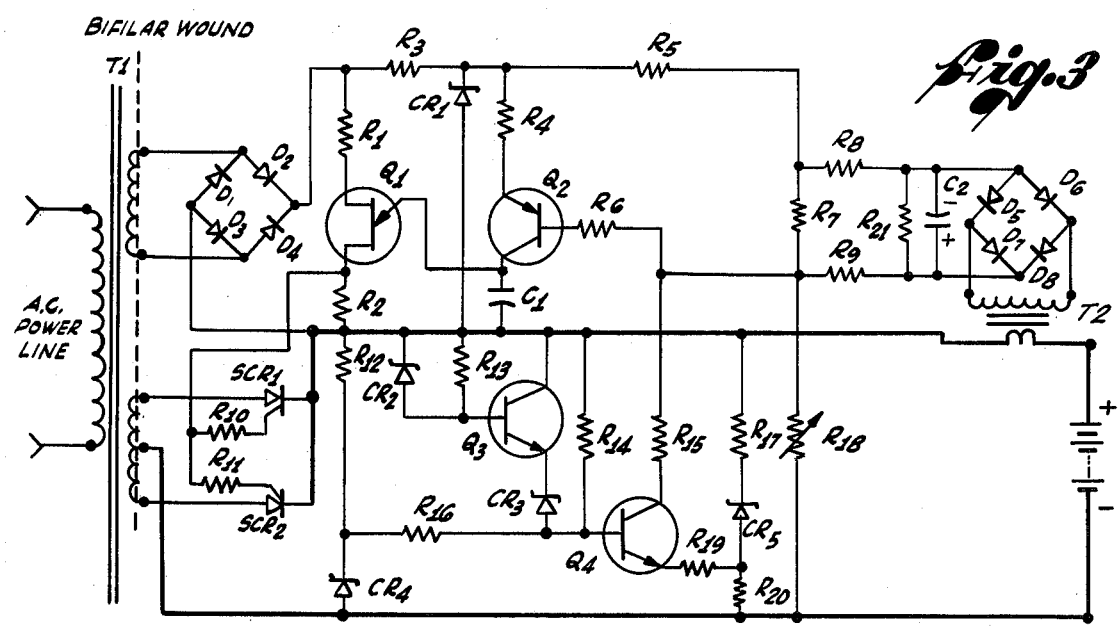

BATTERY CHARGING SYSTEM

CROSS REFERENCE TO A RELATED APPLICATION

This is a continuation-in-part of co-pending application Ser. No. 462,752, filed Apr. 22, 1974, now abandoned, and entitled BATTERY CHARGING SYSTEM.

BACKGROUND OF THE INVENTION

1. Field of the Invention

The present invention relates generally to battery charging systems and, more particularly, to such a system for optimally charging storage batteries in as short a time as possible without damage.

2. Description of the Prior Art

In the field of battery powered systems, the lead-acid storage battery has found use in a wide diversity of applications. Normally, such batteries are used in conjunction with some form of recharging apparatus which is either continuously or periodically connected to the battery.

Heretofore, battery chargers were designed for the charging characteristics of a typical battery. However, it has been found that actual batteries vary widely in internal electrical parameters and their ability to accept charge during charging and their discharging characteristics. The battery parameters are dependent, in part, on particular battery configurations of different manufacturers, differences from battery to battery of a particular manufacturer, the environment in which the battery has been operated, the type of use to which the battery is put, and the age of the battery.

The variations in battery characteristics are so great that the assumption of a typical battery for determining charger characteristics can result in undercharging one battery and overcharging another battery to the point of damage. Additionally, some applications of storage batteries require the series or parallel connection of a number of batteries to provide particular voltage or current requirements. In typical battery combinations, the discharged state of the cells of the batteries, as well as their ability to accept charge varies widely. Thus, when all of the batteries are charged with a common charger, the charging conditions for the combined batteries can result in some batteries in the combination being undercharged and others being overcharged to the point of damage.

Thus, there has long been a need in the field of batteries and battery chargers for a charging system which could quickly and fully charge batteries without damage regardless of their age or condition. This need has been particularly long felt for battery charging systems designed to commonly charge a number of batteries connected together for a particular purpose. The present invention fulfills this need.

SUMMARY OF THE INVENTION

The battery charging system of the present invention provides a means for charging a battery or batteries quickly and fully regardless of particular characteristics due to age, use or the like. The apparatus and method of the invention provide for the continuous sensing of pertinent battery parameters over a complete charging cycle and making appropriate adjustments in the charging rate of the battery when predetermined transitions in those parameters occur during the charging cycle. The adjustments made are such that the charging rate for a battery or combination of batteries remains optimal even during the transition periods. The battery or batteries then continuously acquire an optimal charge, without damage, throughout the complete charging cycle.

In one embodiment of the charging system of the invention, the state of the pertinent parameters are determined by sensing the terminal voltage of a lead-acid storage battery and the charging current through the battery. Thus, the state of charge of the battery can be determined with nothing more than the conventional connections to the terminals of the battery. These two parameters are combined in a number of ways to generate appropriate signals for controlling the charging current throughout the charging cycle. In particular, the internal electromotive force of the battery, its internal impedance and the current through the battery all vary throughout the charging cycle and these variations are reflected in the battery terminal voltage and the charging current. In the system of the invention, the rate of change and instantaneous value of these parameters are sensed throughout the charging cycle and predetermined parameter combinations are utilized in accordance with known battery charging characteristics to generate appropriate signals for adjusting the charging current at any particular time during the charging cycle. Thus, it can be seen that the charging current is controlled throughout the charging cycle and is dependent on the state of charge of the battery as reflected by its terminal voltage and charging current.

In an alternate, and presently preferred, embodiment of the charging system of the invention, the states of the pertinent battery parameters are determined by primarily sensing the terminal voltage of the storage battery and monitoring the amount of charge applied to the battery through the transitional states of the battery. Thus, as the battery reaches the normal transitional states, the measured amount of charge delivered to the battery to those transition states is used to control the final charging phases to completely charge the battery. During the initial high current charging stage, the terminal voltage signal is combined with a signal indicative of the ambient air temperature in the vicinity of the battery and the charger to adjust the high charging current to an optimum value. It has been found that the optimum charging current is substantially linearally dependent upon the ambient air temperature external to the battery.

As in the first embodiment of the charging system of the invention described above, the terminal voltage of the battery is tracked during the high current charging stage and the high charging current is slowly tapered until the transitional knee is reached and then the charging current is optimally tapered down to the finishing current value. During the high charging stage and the taper charging stage, the amount of charge delivered to the battery is monitored and, as the terminal voltage of the battery rises above a predetermined optimal point, the measured charge is used as a determinative factor in setting the length of time the finishing current will be applied to the battery.

Therefore, the amount of charge applied to the battery during the finishing stage, where battery parameters are difficult to measure, it is determined by the amount of charge received by the battery during the high current stage and the taper current stage when the parameters are much easier to measure effectively. The highly variable final terminal voltage of the battery and its difficult to measure transitions then do not govern the length of time a finishing current is applied to the battery, preventing overcharging, heating and attendant gassing.

It should also be appreciated that, while the presently preferred embodiment of the charging system of the invention was designed for lead-acid storage batteries, the principles of the invention are equally applicable to other types of batteries. Therefore, the principles of the battery charging system of the present invention provide for the continuous sensing of pertinent battery parameters and controlling the charging current in accordance with particular transitions in those parameters regardless of the actual value of the battery terminal voltage or the like. Any particular battery is then charged at an optimal charging rate, eliminating the possibility of undercharge or overcharge.

Additionally, the charging system of the present invention incorporates a charging current control during the transitions which is of particular advantage in charging a series string of batteries which may vary in their condition. The charge rate changes are made in such a way that all of the batteries in a string are continuously gaining charge during the transitions without damage to the other batteries in the string. Thus, all of the batteries in a seried string can be made to attain full charge at some time during the charging cycle, assuming, of course, that the condition of all of the cells of the batteries is such that they are capable of accepting full charge. These and other advantages of the present invention will become apparent from the following detailed description of the invention.

DESCRIPTION OF THE DRAWINGS

FIG. 2 is an illustrative graph of the changes in the terminal voltage and charging current of the battery during a charging cycle;

FIG. 3 is an electrical schematic diagram of an illustrative first embodiment of a battery charging system constructed in accordance with the present invention.

DESCRIPTION OF THE PREFERRED EMBODIMENT

Figure 1:
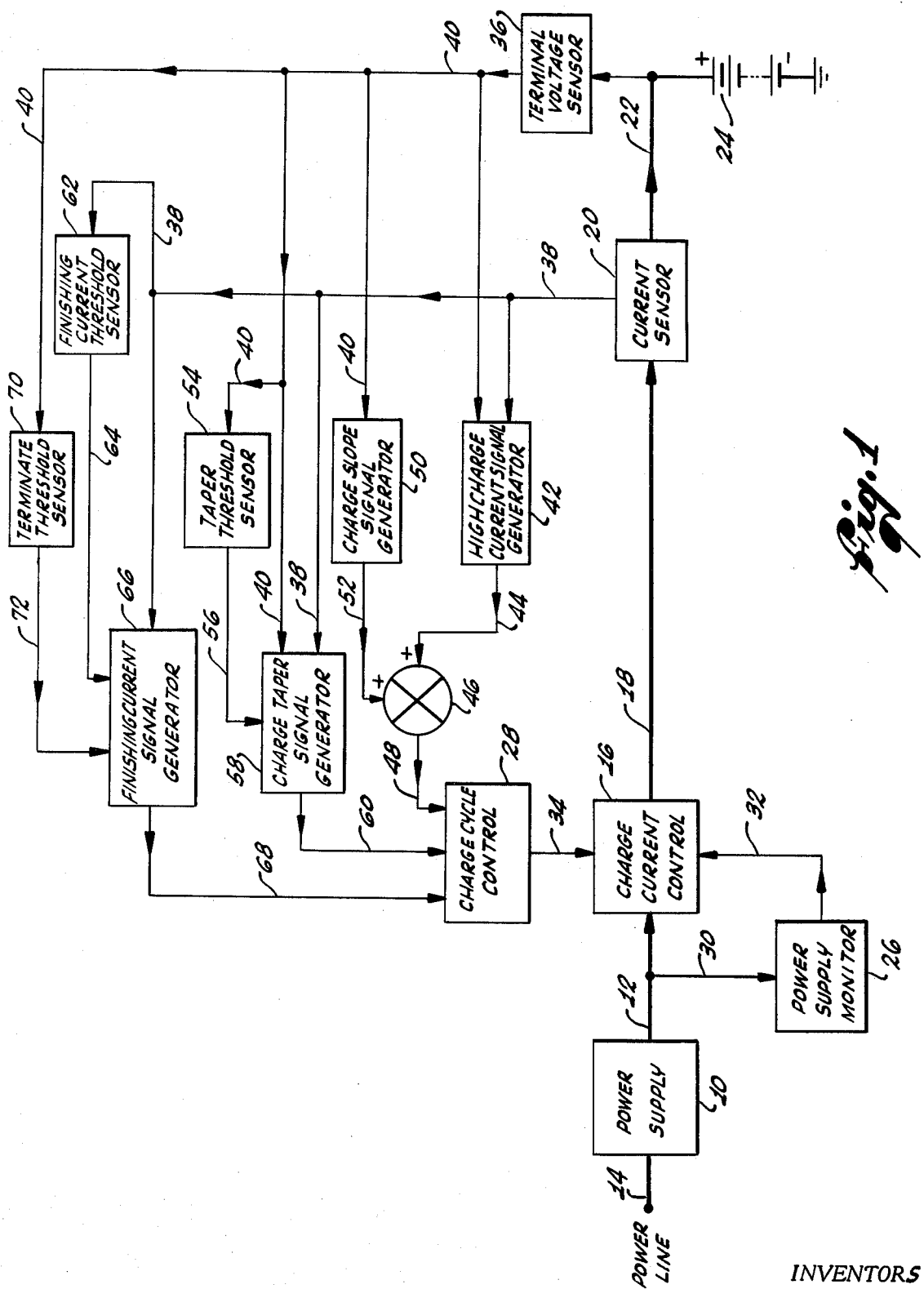
FIG. 1 is a block diagram of the battery charging system of the present invention.

The operation of the battery charging system of the present invention can be best understood by first briefly considering the general characteristics of a lead-acid storage battery. In a fully charged battery, an internal electromotive force or voltage ($E_i$) is generated by chemical action between an electrolyte and the plates within the battery. The terminal voltage ($E_t$) during discharge is equal to the internal voltage $E_i$ minus the voltage drop across the internal impedance ($Z_i$) times the current ($I_d$) through the battery.

As the battery is discharged, the internal voltage $E_i$ and the specific gravity of the electrolyte gradually decreases and the internal impedance $Z_i$ gradually increases. Toward the end of discharge, there is a point at which the internal impedance $Z_i$ increases rapidly and the battery is normally considered to be discharged at this point.

When the battery is charged, its terminal voltage $E_t$ is equal to the instantaneous internal voltage $E_i$ plus the instantaneous internal impedance $Z_i$ times the charging current ($I_c$). During the charging cycle, the internal voltage $E_i$ and the specific gravity of the electrolyte gradually increase and the internal impedance $Z_i$ gradually decreases until the battery is approximately 80 – 90% fully charged. At this point, the internal chemical changes within the battery are such that the battery is said to have reached the "gassing point". This transition point in the state of the charge of the battery is reflected in the internal impedance $Z_i$ of the battery which increases relatively sharply. For some batteries near the end of their useful lives, the transition in internal impedance $Z_i$ may occur without the formation of gas at all or only a slight formation of gas.

When the charging cycle reaches this point, it is well known that any further attempts to charge the battery at a high charging current $I_c$ causes the increased generation of hydrogen gas and a rapid rise in temperature which can result in irreversible damage to the battery. Therefore, it is conventional practice to cease charging the battery at the high current rate and, if the battery is to be charged further, a small current or "trickle" charge is used. Normally, at this point, the rate of rise of the specific gravity of the electrolyte decreases markedly.

However, in the charging system of the present invention, the charging current is decreased at a predetermined taper rate which permits the charging of the battery to proceed with a continued increase in the specific gravity of the electrolyte during the transitional period from the high charging current to a finishing rate current ($I_f$). The charger taper can be accomplished without permitting the battery to rise excessively in temperature. Additionally, it has been found to be of particular value in charging a series string of batteries to provide a finishing current $I_f$ which is substantially above conventional trickle charge currents in order to finish the charging of older batteries and batteries in poor condition without causing harm to batteries which are in better condition and may be already fully charged.

As the finishing current $I_f$ is applied to the batteries, the terminal voltage $E_t$ continues to rise slowly until a point is reached where the batteries are fully charged. At this time, the finishing current $I_f$ ceases to produce a voltage rise. Therefore, when no further voltage rise is sensed during the finishing current portion of the charging cycle, the charging cycle should be terminated.

However, as sensing the cessation of terminal voltage rise is exceedingly difficult to practically effect an alternative technique, presently preferable, is to monitor the charge delivered to the battery during the high current and taper current stages and substantially estimate the optimum finishing current time period required to completely charge the battery. The finishing current is applied to the battery for the estimated time and the charging cycle is terminated.

While the characteristics of a lead-acid storage battery have been briefly described during the charge and discharge, it should be appreciated that the parameters discussed fluctuate widely with the temperature of the battery, the specific gravity of the electrolyte, the age of the battery, the applied charging current, the individual structural variations in batteries of different manufacturers, and even between batteries of the same manufacturer. Thus, the battery charging system of the present invention operates on the principle of continuous sensing of the pertinent parameters of the battery which indicate its condition during a charging cycle and the charging current is appropriately adjusted to maintain the optimal charging current to the battery without causing any damage.

Figure 4:
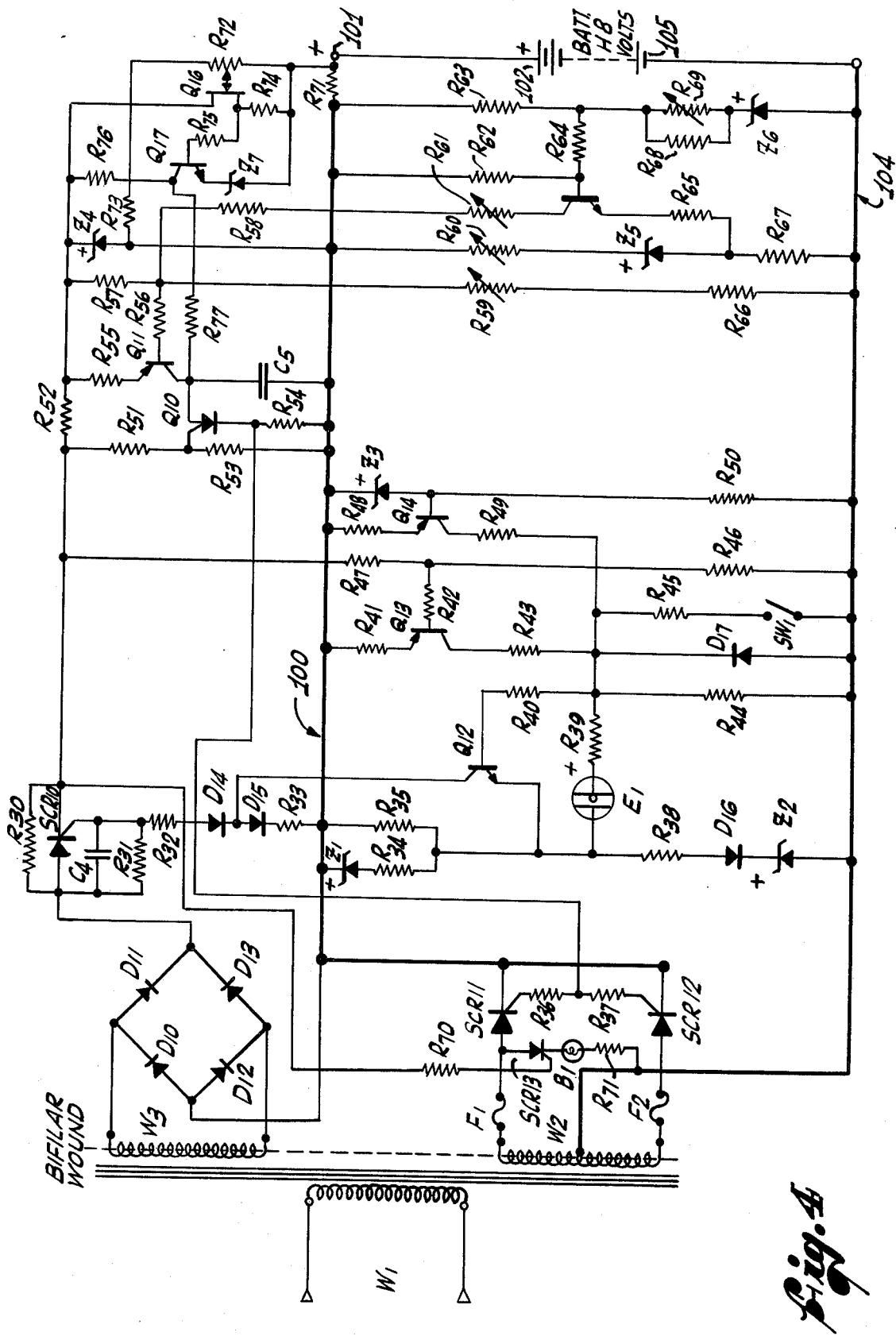
FIG. 4 is an electrical schematic diagram of a second, and presently preferred, embodiment of the invention.

The basic principles of operation of the battery charging system of the present invention can best be understood by reference to FIGS. 1 and 2 of the drawings. It should be understood that FIG. 1 is a functional block diagram which illustrates the signal considerations and functional operations performed by the system of the invention and that the actual circuits for effecting those functions illustrated in the first and second embodiments as shown in FIGS. 3 and 4 as a practical matter of circuit design, single circuit components may perform more than one of the illustrated functions.

Basically, the battery charging system includes a power supply 10 which generates suitable direct current voltages and currents on a line 12. The source of power for the power supply 10 is typically an AC power line 14. The output of the power supply 10 on line 12 is fed through a charge current control 16, and another line 18 to a current sensor 20 for the first embodiment which senses the charging current fed through a line 22 to a battery 24 to be charged. In the second and presently preferred embodiment, the current sensor 20 is not used and its function is replaced by a thermal sensor as discussed below.

The charge current control 16 controls the charging current delivered to the battery 24 throughout the charging cycle and the input signals to the charge current control are derived from a power supply monitor 26 and a charge cycle control 28. The power supply monitor 26 is connected to the output line 12 of the power supply 10 through a line 30 and feeds a control signal through a line 32 to the charge current control 16 to compensate for the normal periodic fluctuations of the input voltage on the power line 14. The charge cycle control 28 delivers the main controlling signals over a line 34 to change the charging current delivered to the battery in accordance with the sensed transitions in the state of charge of the battery 24.

In this respect, it should be noted that there are three main stages in a complete charging cycle in accordance with the present invention. During the first stage, the main high charging current is delivered to the battery until the battery reaches approximately 80 – 90% of full charge. The value of the high charging current is best empirically determined by measuring the particular characteristics and size of the battery or batteries to be charged. In one application in which the condition of a series string of batteries varied widely, a high charging current of approximately 25 to 28 amperes was found to be acceptable.

During the second stage, the charging current is tapered at a predetermined rate from the high charging current to a finishing current. This predetermined taper rate is controlled to maintain the battery in an optimal charging condition during the transition from the high charging current to the finishing current. During the third stage, the battery is charged with a relatively low finishing current until the battery reaches full charge and the charging cycle is terminated.

As was discussed above, the transitions between the three stages of charging are made in accordance with sensed transitions in the parameters of the battery 24. In particular, it will be appreciated that the two battery parameters which can be directly sensed are the current through battery 24, sensed by the current sensor 20 for the first embodiment, and the terminal voltage of the battery, sensed by a terminal voltage sensor 36. While the actual transitions in the state of charge of the battery 24 are due to the factors discussed above, such as changes in the internal impedance of the battery Zi, its internal voltage Ei, and the charging current Ic, the transitions in these parameters can be determined by predetermined combinations of a current signal voltage on a line 38 from the current sensor 20 for the first embodiment, and a terminal voltage signal on a line 40 from the terminal voltage sensor 36.

Therefore, during the first stage of charging when the high charging current is delivered to the battery 24, the voltages on the current signal line 38 and the terminal voltage signal line 40 are combined in a high charge current signal generator 42 to generate a signal connected by a line 44 to a summing junction 46 the output of which is in turn fed through a line 48 to the charge cycle control 28 to cause a relatively high charging current to be delivered to the battery 24.

In conventional current controlled battery charging systems, a relatively high charging current is continuously delivered to the battery during a comparable first charging stage. However, it has been found that relatively gradually decreasing the high charging current on a slight slope while the terminal voltage of the battery 24 increases during the first charging stage results in greatly improved electrochemical changes within the battery. Therefore, a charge slope signal generator 50 is included in the system of the present invention which receives as its input the terminal voltage signal on the line 40 and generates a suitable slope signal on a line 52 which serves as the second input to the summing junction 46 to modify the signal on the line 48 to the charge cycle control 28.

This operation can best be seen by reference to FIG. 2 in which the time between t0 and t1 represents the first stage of the charging cycle. It can be seen that the charging current Ic begins at a relatively high transitional level I1, which rapidly is reduced to a high beginning current I2. While the terminal voltage Et of the battery begins at a relatively low voltage E1. The time space between t0 and t1 is greatly compressed and may represent several hours of charging time. It can be seen that during this time the charging current gradually drops from the beginning current I2 to a somewhat lower charging current I3. It should be noted that the changes in the charging current Ic changes and terminal voltage Et are exagerrated to more clearly illustrate the transition points.

As was discussed above, when the first stage of charging is completed and the battery is at approximately 80 – 90% of full charge, the internal impedance Zi of the battery 24 increases relatively quickly and this change is reflected in a corresponding relatively quick increase in the terminal voltage Et of the battery as illustrated in FIG. 2 in the vicinity of t1. In the block diagram of the battery charging system of the invention illustrated in FIG. 1, this relatively fast change in the internal voltage Et of the battery 24 is sensed by a taper threshold sensor 54 which receives as its input the terminal voltage signal on line 40 and feeds an enabling signal through a line 56 to a charge taper signal generator 58. The charge taper signal generator 58 receives as its input the current and voltage signals on line 38 and 40, respectively, and generates an appropriate output signal on line 60 which is fed to the charge cycle control 28. The charge cycle control 28, in turn, controls the charge current control 16 to gradually taper the charging current from the relatively high current I3 to the finishing current If during the time period between t1 and t2, as shown in FIG. 2.

During this time period, the terminal voltage Et of the battery 24 continues to rise and is charged to a voltage E3 which is reached when the tapering charging current reaches the finishing current If value at time t2. Again, the actual taper rate is best determined empirically from the type of battery being charged in order to prevent the specific gravity of the electrolyte from decreasing substantially during the taper as discussed above.

At this point, the finishing current If is sensed by a finishing current threshold sensor 62 which receives as its input the current signal on line 38 and delivers an enabling signal on a line 64 to a finishing current signal generator 66 which in turn delivers a suitable signal over a line 68 to the charge cycle control 28 to cause the charge current control 16 to deliver the finishing current to the battery 24. The finishing current If may be set at any predetermined level but it has been found that a somewhat higher finishing current than is conventional results in the continued charging of batteries which are in poor condition and not completely charged without causing any damage to batteries in good condition which have attained full charge by this time. The actual finishing current level should be set in accordance with the overall condition of the batteries and the time allotted for complete charging. For the one application mentioned above in which the conditions of batteries varied widely, a finishing current of approximately 3 to 5 amperes was found to be acceptable.

As was discussed above, the finishing current If is delivered to the battery 24 until all of the batteries are completely charged which is indicated by the leveling off of the terminal voltage Et of the battery 24. It should be noted that the actual terminal voltage Et of the battery 24 when it levels off can vary very widely and it is a distinct advantage of the present invention that the transition controls the termination of the charging cycle and not the terminal voltage level itself.

The finishing current stage of the charging cycle is illustrated in FIG. 2 from time t1 to time t4 with the time period greatly compressed. As can be seen, the terminal voltage Et of the battery 24 gradually increases from E3 at time t1 to t4 when the terminal voltage Et levels off at time t3. The leveling off of the terminal voltage Et is sensed by a terminate threshold sensor 70 in the first embodiment, as its input, the terminal voltage signal on line 40. The output signal on a line 72 from the terminate threshold sensor 70 is connected to the finishing current signal generator 66 which inhibits the output signal on line 68 to terminate the charging cycle. As will be discussed below, the termination threshold is very difficult to detect and, in the second, and presently preferred embodiment of the invention, the finishing current is terminated after a time period based upon the amount of charge delivered to the battery during the high and taper charge stages. A feature of the charging system of the present invention is that the transition points along the charging cycle occur in a relatively well defined manner and the various threshold sensors are activated in a predetermined sequence. If the normal charging cycle is interrupted or there is a marked deviation from the normal pattern, the charge cycle control 28 and charge current control 16 are disabled to immediately terminate the charging cycle. Thus, if the battery to be charged is in extremely poor condition or there is an abnormal condition in the charging system, such as a short circuit, the charging cycle is immediately terminated, eliminating the possibility of damage to either the components of the charging system or the battery.

An electrical schematic diagram of a first embodiment battery charger constructed to operate in accordance with the principles of the present invention is shown in FIG. 3. It should be appreciated that the implementation of the invention may take various forms and that the circuit of FIG. 3 is only illustrative of one form of construction.

In the circuit diagram of the first embodiment shown in FIG. 3, the power supply 10 is a transformer T1 which is a high leakage reactance type with two bifilar wound secondaries to insure close face tracking of the voltages in the secondary windings.

The charge current control 16 of FIG. 1 includes silicon controlled rectifiers $SCR_1$ and $SCR_2$, connected to a secondary winding of power transformer $T_1$, and triggered by unijunction transistor $Q_1$ and transistor $Q_2$ in a variable timing circuit configuration.

The function of the power supply monitor 26 is accomplished by connecting the base 1 circuit of unijunction transistor $Q_1$ to the unregulated voltage output from the auxiliary secondary power supply including a full wave bridge circuit including diodes D1 through D4. The voltage output from the secondary power supply follows the power supply fluctuations which then varies the base to base voltage unijunction transistor $Q_1$. The current sensor 20 includes a transformer $T_2$ operating essentially as a current transformer to deliver a voltage signal across resistor $R_7$ which is combined with various voltages dependent upon the terminal voltage of the battery to generate a signal at the base of transistor $Q_2$ in the charge current control section 16. The terminal voltage sensor 36 is a direct connection across the terminal voltage and is applied to various configurations including transistors, resistors and zener diodes to perform the various circuit functions of the high charge current signal generator 42 the charge slope signal generator 50 the charge taper signal generator 58 and the taper threshold sensor 54.

In particular, as is well known, circuitry including transistors, resistors and zener diodes will exhibit, by a circuit theory called superposition, nonlinear conductance characteristics which are used to advantage in this particular application. As the terminal voltage of the battery rises during charging, the conductance characteristics of transistors $Q_3$ and $Q_4$ and zener diodes $CR_2$ through $CR_5$, change their conductance characteristics at predetermined threshold voltages so that for initial charging times, certain of these components will be inactive. The result is that during the initial charging stage, the high charge current signal generator 42 and the charge slope signal generator 50 will be operative while certain circuit components are still inactive because the terminal voltage is not yet high enough. As the terminal voltage rises to particular threshold voltages at which certain circuit components, particularly the zener diodes, change their characteristics, the functions of the charge taper signal generator and the taper threshold sensor begin to function, modifying the control voltage which is applied to the base of $Q_4$ and thence through collector resistor $R_{15}$ to the base of transistor $Q_2$ in the charge current control 16 section. Similarly, the current signal generator across resistor $R_7$ is effecting the operation of these threshold circuit changes.

Component values for the battery charger circuit shown in FIG. 3 are as follows:

| | |
|---|---|
| $Q_2$ ZTX303 (FERRANT I) | $C_1$ 0.22mfd |
| $Q_2$ ZTX503 (FERRANT I) | $C_2$ 2 mfd |
| $Q_3$, $Q_4$ 2N699 | $R_1$ 12 Kilohms |
| $SCR_1$, $SCR_2$ T4000 (Westinghouse) | $R_2$ 100 ohms |
| $CR_1$ MZ1000 (30 volts) | $R_3$ 1.5 Kilohms |
| $CR_2$ MZ1000 (12 volts) | $R_4$ 6.8 Kilohms |
| $CR_3$ MZ1000 (14 volts) | $R_5$, $R_6$, $R_7$, $R_8$, $R_{21}$ |
| $CR_4$ MZ1000 (22 volts) | 10 Kilohms |
| $CR_5$ MZ1000 (19 volts) | $R_9$ 68 Kilohms |
| $D_1$–$D_8$ MDA 920A4 BRIDGE RECTIFIERS (2) (MOTOROLA) | $R_{10}$, $R_{11}$ 10 ohms |
| | $R_{12}$ 22 Kilohms |
| $T_2$ primary 16T | $R_{13}$ 4.7 Megohms |
| secondary 1000T | $R_{14}$ 1 Megohm |
| Batt. 36 volts | $R_{15}$ 100 Kilohms |
| (66 volt batteries connected in series) | $R_{16}$, $R_{19}$ 1 Kilohm |
| | $R_{17}$ 470 ohms |
| | $R_{18}$ 250 Kilohms (variable) |
| | $R_{18}$ 15 Kilohms |

Turning now to FIG. 4, a second and presently preferred embodiment of the invention is shown in schematic diagram form. As previously discussed above, except for the lack of current sensing and an alternate form of determining how long the finishing current will be applied to the battery, the functions of the charging system are as outlined in the block diagram of FIG. 1. Thus, the charging cycle includes a high current stage, a taper current stage and a finishing current stage which is terminated when the battery has received a full charge.

During the charging cycle, the battery terminal voltage goes through the transistions described above in that the terminal voltage gradually increases until a point where the battery is approximately 85% charged and a relatively sharp increase, or knee, in the terminal voltage is evidenced. The charging current is then gradually tapered to a finishing current. Thereafter, the terminal voltage very gradually increases as the finishing current is applied. As discussed above, when the terminal voltage ceases to increase at all, the battery is considered to be fully charged and any further attempt to charge the battery will result only in the generation of heat and gas. Heretofore, it has been relatively difficult to determine when the battery is fully charged as the steadying of the terminal voltage to a constant value is very difficult to detect using conventional and relatively inexpensive circuit components.

In the second, and presently preferred, embodiment of the invention shown in FIG. 4, the time the finishing current is applied to the battery to effect a full charge utilizes an estimation technique in that the proper finishing current time is emperically estimated from a consideration of the amount of charge delivered to the battery during the high current and tapering current stages of the charging cycle. In the circuit shown in FIG. 4, the amount of charge delivered to the battery during these stages is determined by the relative terminal voltage of the battery, indicating basically the state of charge and the time during which the charging current is applied. The estimation of the charge delivered to the battery during the high current and tapering current stages of the charging cycle is made by employing a circuit element capable of storing an electrical parameter corresponding to the terminal voltage and the time during which the high current and tapering current stages are in effect.

In the embodiment shown in FIG. 4, this circuit element is an electroplating cell, the operation of which is well known in the art and no novelty for which is claimed herein. As brief background information, a relatively low current is passed through an electroplating cell during which a metallic substance, such as gold, is plated on an electrode. The amount of the metallic substance which is plated is directly proportional to the magnitude of the current applied to the cell and the length of time for which the current is applied. In the circuit shown in FIG. 4, the magnitude of the current is dependent upon the terminal voltage of the battery and the length of time the current is applied corresponds to the length of time required for the high current and taper current charge stages.

The plating process is reversible and if a constant "deplating" current is applied to the electroplating cell, the amount of time required to deplate the cell can be used as a measure of the amount of plating which has occurred. Thus, in the charging circuit of FIG. 4, the electroplating cell is charged during the high charge current and taper charge current stages and, at the end of those stages, the amount of plating which has occurred on the cell is indicative of the state of discharge and overall condition of the battery before charging began. Based on that estimation and the amount of plating which occurs on the cell, a fixed deplating current is applied to the cell during the finishing current stage of the charging cycle. When the cell is completely deplated, the finishing current is terminated and the charging cycle is considered complete.

Thus, the state of discharge or overall condition of the battery determines how long the battery will be in the high current charge and transition charge stages which is thereafter used to predetermine the finishing current time period. Batteries which are older or generally in poor condition require proportionally longer time periods in the initial charging stages and also require longer time periods in the finishing current stage in order to achieve full charge. Therefore, the proportionally longer time period in the high current and taper current stages produces a greater electroplating in the cell which requires a longer time period to deplate in the finishing current stage. In addition, while the time periods for the initial charging stages is a factor, the amount of current applied to the battery during these stages is also dependent upon their condition which is reflected again by the terminal voltage of the battery during those stages. Therefore, the amount of plating which occurs on the cell is dependent both upon the time which is required for the initial charging stages and the terminal voltage of the battery.

Turning now to the specific circuitry shown in FIG. 4, the transformer $T_1$ is the same as the transformer $T_1$ for the charging circuit shown in FIG. 3. Thus, transformer $T_1$ is a loose coupled high reactance type with a primary winding $W_1$ and a power secondary winding $W_2$ which will inherently limit the current through it as discussed above. The charging current delivered to the battery is controlled by controlling the conduction angles of a pair of silicon controlled rectifiers $SCR_{11}$ and $SCR_{12}$ connected in a full wave bridge configuration in the secondary winding $W_2$. Fuses $F_1$ and $F_2$ serve the normal protective function of preventing abnormally large currents.

The cathode terminals of the silicon controlled rectifiers $SCR_{11}$ and $SCR_{12}$ are connected directly to a positive battery bus 100 connected to a positive output terminal 101 connected to the battery 102 through a very small current sensing resistor R70 and the center tap of secondary winding $W_2$ is connected to a negative battery bus 104 correspondingly connected to the negative terminal of battery 105.

In the conventional manner, the current applied to the positive battery bus 100 is controlled by varying the conduction angle of the silicon controlled rectifiers $SCR_{11}$ and $SCR_{12}$ by means of control voltage pulses applied to their gate terminals through gate resistors $R_{36}$ and $R_{37}$ respectively. The control voltage pulses for triggering the silicon controlled rectifiers are derived from a charging regulator circuit which senses the battery terminal voltage and the transitions therein. The charging regulator circuitry is designed to sense and track the terminal voltage of the battery and certain sections of the timing circuitry are powered by connection directly across the positive and negative battery buses 100 and 104, respectively. Other sections of the regulator circuitry are powered by an auxiliary voltage supply derived from a second secondary winding $W_3$ and a full wave bridge rectifier circuit including diodes $D_{10}$ through $D_{13}$.

It should be appreciated that the resultant rectified voltages of both the first power secondary winding $W_2$ and the auxiliary or second secondary winding $W_3$ remain unfiltered and the transformer configuration insures that the resultant DC voltages have substantially the same phase relationship. Certain of the regulator circuitry is powered directly by the direct current voltage from the auxiliary power supply while other portions of the regulator circuitry are powered by an unfiltered, but regulated, voltage derived across a zener diode $Z_4$ in the normal manner. As will be appreciated, the unregulated power from the auxiliary power supply tracks the a.c. power line voltage to effect the function of the power supply monitor 26 of FIG. 1.

There are basically two charging regulator sections associated with the battery charging system shown in FIG. 4. The first is a current control section which tracks the terminal voltage of the battery during its transitions and adjusts the charging current accordingly as was described in detail above. The second, or charge control section, also tracks the terminal voltage of the battery over the time of the high current and taper current stages of the charging cycle to generate an estimated value for the charge delivered to the battery during those times. As was described above, the amount of charge delivered to the battery determines the length of the time that the finishing current will be applied to the battery. The charge control section therefore includes circuitry for terminating the charging current to the battery at that time.

The current control section of the regulator comprises mainly a timing pulse generator under the control of terminal voltage tracking circuitry. The pulse generator produces triggering pulses for the silicon control rectifiers $SCR_{11}$ and $SCR_{12}$. In particular, the timing pulse generator includes a programmable unijunction transistor $Q_{10}$ and a resistor capacitor timing circuit configuration with the anode of unijunction transistor $Q_{10}$ connected to the junction of a capacitor $C_5$ and collector of a timing transistor $Q_{11}$. The opposite terminal of the capacitor $C_5$ is connected to the positive battery bus 100 and the emitter of the transistor $Q_{11}$ is connected through an emitter resistor $R_{55}$ to the regulated auxiliary voltage present at the cathode terminal of zener diode $Z_4$. The cathode terminal of the programmable unijunction transistor $Q_{10}$ is connected through a resistor $R_{54}$ to the positive battery bus 100 and the junction of the cathode of transistor $Q_{10}$ and resistor $R_{54}$ is connected to the junction of gate resistors $R_{56}$ and $R_{37}$ connected to the silicon control rectifiers $SCR_{11}$ and $SCR_{12}$. The programmable unijunction transistor $Q_{10}$ is set to trigger at a particular voltage by means of connecting a voltage present at the junction of voltage divider resistors $R_{51}$ and $R_{53}$ to the gate terminal of the transistor. The opposite terminal of resistor $R_{53}$ is connected to the positive battery bus 100 while the opposite terminal of resistor $R_{51}$ is connected to the unregulated auxiliary voltage supply. The unregulated auxiliary voltage supply is connected through a ballast resistor $R_{52}$ to the cathode terminal of a zener diode $Z_4$ to provide the regulated auxiliary voltage supply.

The timing transistor $Q_{11}$ functions as a variable resistor in an RC charging circuit and when the voltage across capacitor $C_5$ reaches the firing voltage of the unijunction transistor $Q_{10}$, capacitor $C_5$ quickly discharges developing a pulse voltage across resistor $R_{54}$ to trigger the silicon control rectifiers $SCR_{11}$ and $SCR_{12}$ as discussed above. The trigger point for the unijunction resistor $Q_{10}$ is varied or "programmed" by the variations in the a.c. power line due to the fact that the voltage divider consisting of transistors $R_{51}$ and $R_{53}$ which supply the gate voltage for the transistor $Q_{10}$ is connected to the unregulated side of the auxiliary power supply which tracks the variations in the power line voltage.

The conductivity of the timing transistor $Q_{11}$ is controlled by its base bias which is derived by a number of circuits connected across the terminal voltage of the battery between the positive battery bus 100 and the negative battery bus 104. The monitoring or tracking circuits include directly linear circuits and non-linear circuits controlled substantially by zener diodes. Thus, by combining the circuits and adding their effects at the base of timing transistor $Q_{11}$, the control over the timing circuit can be effected non-linearly as the terminal voltage of the battery increases through its transition points.

The simplest control for the base bias of the timing transistor $Q_{11}$ is derived by means of a simple voltage divider circuit connected between the regulated auxiliary power supply and the negative battery bus 104. The voltage divider circuit comprises resistors $R_{57}$, $R_{59}$ and $R_{66}$ connected in series with the base of transistor $Q_{11}$ coupled through decoupling resistor $R_{56}$ to the junction between resistors $R_{57}$ and $R_{59}$. Adjustability is effected by providing that one of the resistors, $R_{59}$, be variable. It can be appreciated that the base bias supplied to transistor $Q_{11}$ varies substantially linearly as the terminal voltage of the battery varies.

A more complex control over the base bias of timing transistor $Q_{11}$ is provided by means of additional circuitry including a resistor $R_{58}$ and $R_{61}$ connected between the junctions of resistors $R_{56}$ and $R_{57}$ through the collector emitter circuit of a transistor $Q_{15}$. The emitter of transistor $Q_{15}$ is connected through an emitter resistor $R_{65}$ to a voltage divider circuit including a zener diode $Z_5$. Resistor $R_{65}$ is connected to the junction of resistors $R_{67}$ and the anode terminal of zener diode $Z_5$ and the opposite terminal of resistor $R_{67}$ is connected to the negative battery bus 104. The cathode terminal of zener diode $Z_5$ is connected through a variable resistor $R_{61}$ to the positive battery bus 100. Thus, the series circuit of resistors $R_{60}$, zener diode $Z_5$, and resistor $R_{67}$ provide a non-linear emitter bias control for transistor $Q_{15}$. Again, further adjustability of this circuit is effected by providing that one of the collector resistors, $R_{61}$ for transistor $Q_{15}$ be variable.

Base bias control for transistor $Q_{15}$ is partially effected by a base resistor $R_{62}$ connected to the positive battery bus 100. The base of transistor $Q_{15}$ is also connected through a decoupling resistor $R_{64}$ to another voltage divider circuit connected between the positive battery bus 100 and the negative battery bus 104. The base bias control voltage divider includes a resistor $R_{63}$ connected between the positive battery bus 100 and the opposite terminal of decoupling resistor $R_{64}$. The opposite terminal of resistor $R_{63}$ is also connected through the parallel combination of a resistors $R_{68}$ and a thermister $R_{69}$ and through the cathode-anode circuit of a zener diode $Z_6$ thereafter connected to the negative battery bus 104. Thermistor $R_{69}$ is located so as to sense the ambient air temperature in the vicinity of the battery. The bias supplied to transistor $Q_{15}$ then varies somewhat linearly with the temperature and non-linearly as effected by zener diode $Z_6$.

Transistor $Q_{15}$ and its associated circuitry provide the current control for the high current and taper current stages of the charging cycle. The effect of the various circuit components varies as the terminal voltage of the battery rises during charging and goes through the transistion points discussed above. This in turn varies the base bias supplied to timing transistor $Q_{11}$ which directly affects the charging current applied to the battery 102.

As there can be variations in the changing current without resultant battery voltage changes, a current smoothing negative feedback circuit is included. Charging current is sensed by the resistor R71 which is connected through a potentiometer R71 and resistor R72 to the positive bus 100. The top of potentiometer R72 is connected to the gate terminal of a junction field effect transistor $Q_{16}$ and the initial bias for $Q_{16}$ is provided by a resistor R74 connected between the source terminal of $Q_{16}$ and the positive output terminal 101. The drain terminal of $Q_{16}$ is connected to the regulated auxiliary power supply. The source terminal of $Q_{16}$ is connected through a resistor R75 to the base of a transistor $Q_{17}$ which has its emitter connected through a zener diode $Z_7$ to the positive output terminal 101. The collector of transistor $Q_{17}$ is connected through a resistor R75 to the regulated auxiliary power supply.

The collector voltage of $Q_{17}$ serves as a secondary charging voltage for the timing capacitor $C_5$ and is connected thereto through a resistor R77. The voltage at the collector of $Q_{17}$ varies inversely with charging current and smooths the charging current to eliminate intermittent variations.

The second or charge control section of the charging regulator also includes circuitry which tracks the terminal voltage of the battery for the purpose of estimating, electronically, the amount of charge which is delivered to the battery during the high current and taper current charging stages. When the terminal voltage of the battery reaches a predetermined point, normally at the end of the taper current stage when the finishing current stage begin, the charge received by the battery to that point as indicated by the degree of plating in the electroplating cell $E_1$, is used to determine the length of time during which the finishing current will be applied to the battery 102.

As the charging characteristics of batteries in both good and bad condition appear somewhat the same in substantially discharged state, the amount of charge delivered to a battery 102 until a particular degree of charge is reached is somewhat independent of the condition of the battery. Therefore, for substantially discharged batteries, evidenced by a relatively low terminal voltage, it is been found desirable to plate the cell $E_1$ at a very low rate. Thereafter, as the battery reaches a substantial charged state such as 50 to 70 percent, the condition of the battery more accurately indicates the rate at which charge can be taken and the plating rate of the cell $E_1$ is increased.

To effect this variable plating rate in the electroplating cell $E_1$, various circuit elements such diodes, resistors and transistors are connected in circuit configurations which, by the theory of superposition, provides a non-linear charging rate for the electroplating cell $E_1$ as the terminal voltage of the battery 102 varies. Thus the cathode voltage of the electroplating cell $E_1$ is provided by a complex voltage divider circuit which includes a parallel circuit comprising, a zener diode $Z_1$ having its cathode terminal connected to the positive battery bus 100 and connected in series with resistor $R_{34}$, connected in parallel with a resistor $R_{35}$ having one terminal connected to the positive battery bus 100 and its opposite terminal connected to the free terminal of resistor $R_{35}$. The connected terminals of resistors $R_{35}$ and $R_{34}$ are connected to the cathode terminal of the plating cell $E_1$ and through a series circuit comprising resistor $R_{35}$ and the anode to cathode circuit of diode $D_{16}$ and the anode-to-cathode circuit of a zener diode $Z_2$ to the negative battery bus 104. Thus, the cathode voltage of the plating cell $E_1$ varies non-linearly with variations in the terminal voltage of the battery 102.

The normal anode voltage of the electrical plating cell $E_1$ is provided by a substantially constant current generator including a decoupling resistor $R_{39}$ connected through a collector resistor $R_{49}$ of a constant current generating transistor $Q_{14}$. The emitter of transistor $Q_{14}$ is connected through an emitter resistor $R_{48}$ to the positive battery bus 100 and the base of transistor $Q_{14}$ is connected to the junction of the anode of a zener diode $Z_3$ and one terminal of a resistor $R_{50}$. The cathode terminal of zener diode $Z_3$ is connected to the positive battery bus 100 and the free terminal of resistor $R_{50}$ is connected to the negative battery bus 104. The effect of the zener diode $Z_3$ and the base-emitter circuit transistor $Q_{14}$ is to produce a substantially constant current at the collector of transistor $Q_{14}$. Thus, during the charging cycle of a battery 102, a substantially constant current is applied to the anode terminal of the electroplating cell $E_1$ while a non-linearly varying voltage is applied to the cathode of the plating cell. Thus, the amount of the plating in the cell $E_1$ is non-linearly dependent upon the terminal voltage of the battery 102 and follows the pattern described above in that, for relatively low terminal voltages, the plating is relatively low while for a terminal voltage of the battery indicating a substantially charged condition, the plating increases.

The variations of the voltage at the cathode terminal of the electroplating cell $E_1$ varies such that at a particular terminal voltage, normally occurring at the end of the taper current stage and the beginning of the finishing current stage of the charging cycle, the amount of plating received by the cell is $E_1$ is substantially zero, as the terminal voltage of the battery 102 increases slightly, the direction of the plating current reverses and the plating cell $E_1$ begins to deplate. It should be appreciated that, at this transistion point, the terminal voltage of the battery 102 is substantially constant and the circuit elements can be chosen so that the deplating current through the plating cell $E_1$ is also substantially constant and the time required for complete deplating of the cell $E_1$ can be substantially predetermined.

The finishing current is supplied to the battery 102 as long as a deplating current is applied through the cell $E_1$. A characteristic of the plating cell $E_1$, as discussed above, is that when the cell is completely deplated, its resistance characteristics change markedly, and will generate a voltage across the cell which is sensed by a transistor $Q_{12}$ with its emitter connected to the cathode of the electroplating cell $E_1$ and its base connected through a decoupling resistor $R_4$ to the terminal of resistor $R_{39}$ opposite the anode of cell $E_1$. The collector of turn off transistor $Q_{12}$ is connected to a pull down circuit, described below, which turns off the auxiliary power supply to the timing circuit described above prohibiting further triggering pulses to the power silicon controlled rectifiers $SCR_{11}$ and $SCR_{12}$. Thus, the charging current to the battery 102 is terminated.

To effect turning off of the charging system of the present invention, a pull down circuit including a silicon controller rectifier $SCR_{10}$ is employed. Basically, the output of the full-wave bridge circuit including diodes $D_{10}$ through $D_{13}$ is connected through the anode-to-cathode circuit of the silicon controller rectifier $SCR_{10}$. The output at the anode of the silicon control rectifier $SCR_{10}$ is the auxiliary power supply which is thereby controlled. Gate control voltage for silicon controlled rectifier $SCR_{10}$ is provided by a complex voltage divider circuit from the output of the full-wave bridge through the parallel resistor $R_{31}$ capacitor $C_4$ combination to the gate circuit and also through a resistor $R_{32}$ through the anode-to-cathode circuits of series connected diodes $D_{14}$ and $D_{15}$ and through a resistor $R_{33}$ to the positive battery voltage bus 100. The circuit is stabilized by connecting a resistor $R_{30}$ across the anode-to-cathode circuit of $SCR_{10}$. The junctions of diodes $D_{14}$ and $D_{15}$ is connected to the collector of turn off transistor $Q_{12}$ and, when transistor $Q_{12}$ is turned on, that the junction of diodes $D_{14}$ and $D_{15}$ is "pulled down" thereby prohibiting the triggering voltage from reaching the gate of silicon control rectifier $SCR_{10}$, and prohibiting the auxiliary power supply from delivering voltage to the timing circuit. To insure that the circuit turns off, a latch circuit is included which comprises a latch transistor $Q_{13}$ having its biasing circuit connected from the auxiliary power supply voltage through a resistor $R_{47}$ and a decoupling resistor $R_{42}$ to the base of transistor $Q_{13}$ and the emitter circuit of transistor $Q_{13}$ connected through an emitter resistor $R_{41}$ to the positive battery voltage bus 100. The collector of latch transistor $Q_{13}$ is connected through a collector resistor $R_{43}$ to the junction of resistors $R_{39}$ and $R_{49}$. The base bias of transistor $Q_{13}$ is controlled by connecting the junctions of resistors $R_{47}$ and $R_{42}$ through a resistor $R_{46}$ to the negative battery voltage bus 104. The base bias of latch transistor $Q_{13}$ is such that the transistor is completely turned off while the auxiliary power supply is operating but, when the auxiliary power supply voltage is turned off, transistor $G_{13}$ is completely turned on which in turn latches the turn off circuit including transistor $Q_{12}$ in a state which will not permit the auxiliary power supply to operate again.

Auxiliary circuit details are included in the charging system shown in FIG. 4, in particular, to indicate that the circuit is in a charging condition, a pilot bulb $B_1$ is employed which derives its power across one side of the power secondary W. One side of the $W_2$ is connected through the anode-to-cathode circuit of a silicon control rectifier $SCR_{13}$, through the bulb $B_1$ and through a current limiting resistor $R_{71}$ to the center tap of winding $W_2$. Gate triggering voltage for $SCR_{13}$ is derived from the auxiliary power supply voltage through a gate resistor $R_{70}$.

In addition, certain circuit elements are added to the circuitry to stabilize the operation of the charge control section of the charging regulator. In particular, a resistor $R_{44}$ is connected between the junctions of the resistors $R_{39}$ and $R_{49}$ to the negative battery voltage bus 104 as a stabilizing bleeder resistor. To provide for the manual turn on of the charging system after the automatic turn off system has operated, a momentary contact switch $SW_1$ is connected in series with a resistor $R_{45}$ between the junction of resistors $R_{39}$ and $R_{49}$ and the negative battery terminal bus 104. When the circuit is in the off condition, and switch $SW_1$ is closed, a plating current is applied to the cell $E_1$ turning on the finishing current circuitry once again for the time required to again deplate cell $E_1$.

The cathode-to-anode circuit of a diode $D_{17}$ is connected between the junction of resistors $R_{39}$ and $R_{49}$ and the negative battery voltage bus 104 as a "reset diode" which provides for the completed deplating of the cell $E_1$ in the event that the AC power line voltage is removed, either accidently or deliberately.

Component values for the battery charging circuit shown in FIG. 4 are as follows:

| | | |
|---|---|---|
| $Q_{10}$ 2N 607 | $R_{30}$ | 3.9 M |
| $Q_{11}$, $Q_{13}$, $Q_{14}$ ZTX 503 (FERRANT I) | $R_{31}$ | 4.7 M |
| $Q_{12}$, $Q_{15}$ $Q_{1}$, ZYX 304 (FERRANT I) | $R_{32}$ | 33K |
| $Q_{16}$ 2N4868 | $R_{33}$ | 2.7 K |
| $Z_1$ 7.5 volts | $R_{34}$, $R_{52}$ | 1.5 K |
| $Z_2$ 29 volts | $R_{35}$, $R_{39}$, $R_{42}$, $R_{56}$, $R_{64}$ | |
| | $R_{74}$, $R_{75}$, $R_{76}$ | 10 K |
| $Z_3$ 8.2 volts | $R_{36}$, $R_{37}$ | 24 ohm |
| $Z_4$ 23 volts | $R_{38}$, $R_{45}$, $R_{53}$, R | 4.7 K |
| $Z_5$ 17 volts | $R_{40}$, $R_{43}$ | 1 K |
| $Z_6$ 20 volts | $R_{41}$ | 150 K |
| $Z_7$ 6.5 volts | $R_{44}$ | 20 M |
| $D_{10}$, $D_{11}$, $D_{12}$, $D_{13}$ MDA-920-5 (Motorla) | $R_{46}$, $R_{58}$, $R_{66}$ | 47 K |
| | $R_{47}$ | 47 ohm |
| | $R_{48}$ | 2.7 M |
| $D_{14}$, $D_{15}$, $D_{16}$, $D_{17}$ IN 4001 | $R_{49}$ | 200 K |
| | $R_{50}$ | 22 K |
| | $R_{51}$ | 18 K |
| $SCR_{10}$, $SCR_{13}$, $SCR_{11}$, $SCR_{12}$, T4000 (Westinghouse) | $R_{54}$ | 100 ohm |
| | $R_{55}$, $R_{57}$ | 6.8 K |
| | $R_{59}$, $R_{61}$ | 100 K |
| $F_1$, $F_2$ | $R_{60}$ | 2 K |
| | $R_{62}$, $R_{70}$ $R_{73}$ | 1 M $E_1$ |
| 560–0002 (Plessy) | $R_{63}$ | 30 K |
| | $R_{65}$ | 1.2 K |
| | $R_{67}$ | 15 K |
| $C_4$ 0.01 mfd | $R_{68}$ | 24 K |
| | $R_{71}$ | 910 ohm |
| (Rodan Indus., Anaheim, Ca. #15DF243) | $R_{69}$ | 24 K thermistor |
| | $R_{72}$ | 5 M potentiometer |
| | $R_{73}$ | 5 K |

While first and second presently preferred embodiments of the battery charging system of the invention have been described in detail, it should be appreciated that many variations and modifications of the basic system may be made for other applications. Thus, the invention is not to be limited, except by the following claims.

We claim:

1. A method of charging a battery comprising the steps of:

sensing the charging current and terminal voltage of the battery, charging said battery with a relatively high and substantially constant current during a high current stage until said terminal voltage rises relatively rapidly indicating a transition phase;

tapering the charging current from the relatively high value to a pedetermined finishing current in a taper current stage, said tapering being at a rate which causes continual rise in said terminal voltage of said battery during said tapering;

monitoring the total charge delivered to said battery during said high and taper current stages;

further charging said battery with said finishing current for a time period based upon said total charge and thereafter terminating said charging of said battery.

2. The method of charging a battery defined in claim 2 including the step of:
decreasing said relatively high current at a very slight slope compared to the slope of said taper current during said high current stage.

3. The method defined in claim 2 wherein:
said finishing current is of a value sufficient to continue charging a battery in poor condition but insufficient to damage a battery in good condition.

4. The method of charging a battery defined in claim 3 including the step of:
decreasing said relatively high current at a very slight slope compared to the slope of said taper current during said high current stage.

5. A method of charging a battery comprising the steps of:
monitoring the terminal voltage of the battery;
charging said battery with a relatively high and substantially constant current until said terminal voltage rises relatively rapidly in a transition phase;
further charging said battery during said transition phase with a taper charge current from said high current to a finishing current value, the current tapering being at a rate which causes the continued rise in said terminal voltage of said battery;
estimating the amount of charge delivered to said battery during said high and taper current stages from said terminal voltage and the time period of said high current and taper current stages; and
further charging said battery with said finishing current value for a time period based upon said estimated charge delivered to said battery.

6. The method defined in claim 1 wherein:
said estimating step includes applying a plating voltage to an electroplating cell which is proportional to said terminal voltage during said high and taper current stages; and
said further charging step includes applying a predetermined deplating voltage to said electroplating cell, said finishing current being terminated when said cell is deplated.

7. The method defined in claim 6 further including the steps of:
monitoring the charging current delivered to said battery; and
substantially smoothing said charging current during said high current stage utilizing the sensed circuit.

8. The method defined in claim 6 wherein:
said estimating step includes applying a plating voltage to an electroplating cell which is proportional to said terminal voltage during said high and taper current stages; and said further charging step includes applying a predetermined deplating voltage to said electroplating cell, said finishing current being terminated when said cell is deplated.

9. A method of charging a battery with a battery charger comprising the steps of:
monitoring the terminal voltage of said battery;
delivering a first high charging current in a high current stage to said battery when the value of said terminal voltage indicates that said battery is substantially discharged, said first high charging current being delivered to said battery until said terminal voltage rises relatively rapidly indicating a transition phase;
tapering the charging current from said first high charging current to a predetermined finishing current in a taper current stage, the tapering current being at a preset rate permitting continued charging of said battery during said taper current stages;
estimating the amount of charge delivered to said battery during said high and taper current stages from said terminal voltage and the time period of said high and taper current stages; and
further charging said battery with said finishing current for a second time period upon said estimated charge delivered to said battery.

10. The method defined in claim 9 wherein:
said estimating step includes applying a plating voltage to an electroplating cell which is proportional to said terminal voltage during said high and taper current stages; and
said further charging step includes applying a predetermined deplating voltage to said electroplating cell, said finishing current being terminated when said cell is deplated.

11. The method of charging a battery defined in claim 10 including the step of:
decreasing said relatively high current at a very slight slope compared to the slope of said taper current during said high current stage.

12. A battery-charging system comprising:
means for monitoring the terminal voltage of said battery;
means for delivering a first high charging current in a high current stage to said battery when the value of said terminal voltage indicates that said battery is substantially discharged, said first high charging current being delivered to said battery until said terminal voltage rises relatively rapidly indicating a transition phase;
means for tapering said first high charging current to a predetermined finishing current in a taper current stage, the tapering current being at a preset rate permitting continued charging of said battery during said taper current stage;
means for estimating the amount of charge delivered to said battery, during said high and taper current stages, from said terminal voltage and the time period of said high and taper current stages; and
means for further charging said battery with said finishing current for a second time period based upon said estimated charges delivered to said battery.

13. The battery-charging system defined in claim 12 wherein:
said means for estimating includes an electroplating cell which is plated during said high and taper currentstages with a plating voltage which is proportional to said terminal voltage; and said means for further charging includes means for applying a predetermined deplating voltage to said electroplating cell, said finishing current being terminated when said cell is deplated.

14. The battery-charging system defined in claim 13 including:

means for monitoring the charging current delivered to said battery; and means connected to said current-monitoring means for substantially smoothing said charging current during said high current stage.

15. The battery charging system defined in claim 12 including:

means for monitoring the charging current delivered to said battery; and means connected to said current-monitoring means for substantially smoothing said charging current during said high current stage.

16. The battery-charging system defined in claim 12 including:

means for gradually decreasing the relatively high value charging current at a very slight slope compared to the slope of said taper current during said high current stage.

17. The battery-charging system defined in claim 12 wherein said finishing current is sufficient to continue charging of a battery of poor condition but insufficient to cause damage to a battery in good condition.

* * * * *

UNITED STATES PATENT AND TRADEMARK OFFICE
CERTIFICATE OF CORRECTION

PATENT NO. : 4,052,656
DATED : October 4, 1977
INVENTOR(S) : MAURICE (NMI) LAVELL and DONALD F. WILSON It is certified that error appears in the above-identified patent and that said Letters Patent are hereby corrected as shown below:

Column 4, line 32, "charger" should be --charge--.

Column 6, line 49, "exagerated" should be --exaggerated--.

Column 12, line 4, "$R_{56}$" should be --$R_{36}$--.

Column 13, line 61, "begin" should be --began--.

Column 14, line 5, "is" should be --has--.

Column 15, line 38, "is" should be --are--.

Column 16, line 34, "$Q_{1y}$" should be --$Q_{17}$--.

Claim 13, lines 4-5, "currentstages" should be --current stages--.

Signed and Sealed this

Twenty-eighth Day of November 1978

[SEAL]

Attest:

RUTH C. MASON
Attesting Officer

DONALD W. BANNER
Commissioner of Patents and Trademarks